United States Patent [19]

Hucul, Jr. et al.

[11] 4,236,870

[45] Dec. 2, 1980

[54] TURBINE BLADE

[75] Inventors: Elias Hucul, Jr., Wallingford, Conn.; Robert E. Gladden, Burlington, Mass.

[73] Assignee: United Technologies Corporation, Hartford, Conn.

[21] Appl. No.: 864,194

[22] Filed: Dec. 27, 1977

[51] Int. Cl.² .............................................. F01D 5/18
[52] U.S. Cl. ................................. 416/97 R; 415/115
[58] Field of Search .......................... 416/96 R, 97 R; 415/115

[56] References Cited

U.S. PATENT DOCUMENTS

| | | | |
|---|---|---|---|
| 3,045,965 | 7/1962 | Bowmer | 416/97 X |
| 3,628,880 | 12/1971 | Smuland et al. | 416/97 X |
| 3,628,885 | 12/1971 | Sidenstick et al. | 416/97 |
| 3,706,508 | 12/1972 | Moskowitz et al. | 416/97 X |
| 3,799,696 | 3/1974 | Redman | 416/97 |
| 3,807,892 | 4/1974 | Frei et al. | 416/97 X |
| 3,989,412 | 11/1976 | Mukherjee | 416/97 R |
| 4,073,599 | 2/1978 | Allen et al. | 416/97 R |

FOREIGN PATENT DOCUMENTS

| | | | |
|---|---|---|---|
| 364747 | 3/1973 | U.S.S.R. | 416/97 |
| 444888 | 11/1974 | U.S.S.R. | 416/96 |

Primary Examiner—Everette A. Powell, Jr.
Attorney, Agent, or Firm—McCormick, Paulding & Huber

[57] ABSTRACT

A convectively cooled turbine blade has a three-pass cooling air passageway. Air enters the blade at its root end, travels along a reversing path through the passageway and is emitted through an array of slots in the blade trailing edge generally configured in the form of a Venetian blind. Pedestals or turning vanes located in the turning areas of the passageway control separation of flow to prevent development of local hot spots. Pedestals located in a midchord portion of the passageway prevent sidewall panel vibration and enhance cooling efficiency. A root metering plate governs magnitude of cooling flow through the turbine blade.

8 Claims, 3 Drawing Figures

TURBINE BLADE

BACKGROUND OF THE INVENTION

This invention relates in general to turbine blades and deals more particularly with an improved convectively cooled turbine blade particularly adapted for use in the second stage of an industrial gas turbine engine.

In gas turbine engines and the like a turbine operated by burning gases drives a blower or compressor which furnishes air to a burner. Such turbine engines operate at relatively high temperatures. The capacity of such an engine is limited to a large extent by the ability of the material from which the turbine blades are made to withstand thermal stresses which develop at such relatively high operating temperatures. The problem may be particularly severe in an industrial engine because of the relatively large size and mass of engine parts. To enable higher operating temperatures and increased engine efficiency without risk of blade failure, hollow convectively cooled turbine blades are frequently utilized. Such blades generally have intricate interior passageways which provide torturous flow paths to assure efficient cooling whereby all portions of the blades may be maintained at relatively uniform temperature. However, such blades are difficult and expensive to manufacture. The present invention is concerned with this problem, and it is the general aim of this invention to provide an improved convectively cooled turbine blade which satisfies required design criteria and which may be manufactured at relatively low cost and up-rated for increased cooling without expensive reoperation or redesign.

SUMMARY OF THE INVENTION

In accordance with the present invention an improved convectively cooled turbine blade has a three-pass cooling passageway which includes an inlet opening at the root end of the turbine and a plurality of connected passage sections which define a reversing flow path through its blade portion to an array of outlet slots which extend along its trailing edge. Pedestals or turning vanes are located at turning areas within the passageway control separation of flow to prevent localized hot spots. Additional pedestals extend between the sidewalls in a midchord portion of the passageway to prevent sidewall vibration and enhance cooling efficiency. A metering plate attached to the root end of the blade governs magnitude of cooling flow through the turbine blade.

DETAILED DESCRIPTION OF PREFERRED EMBODIMENT

Figure 1:
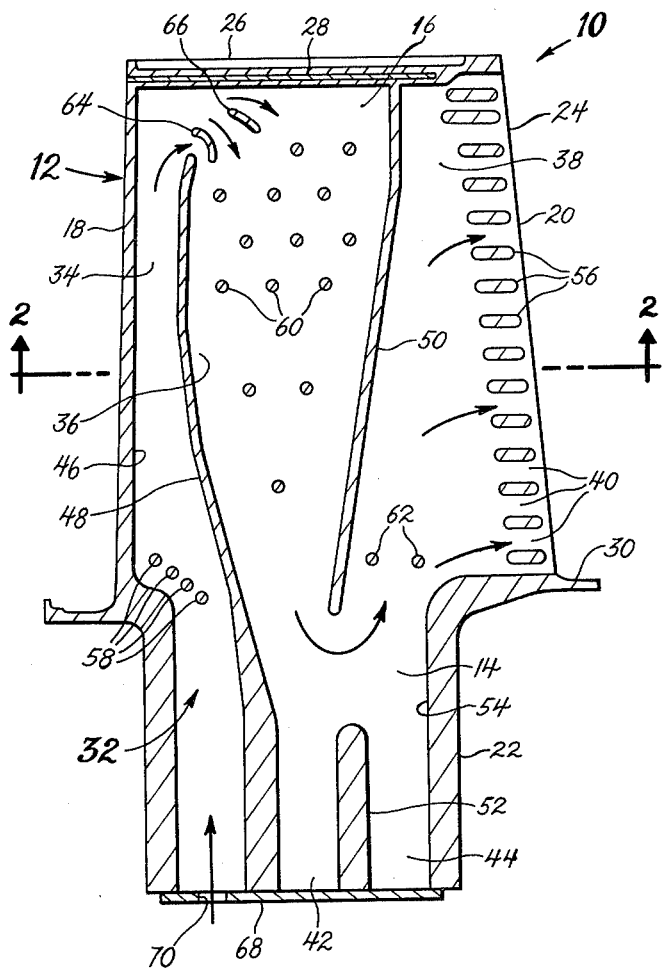
FIG. 1 is a longitudinal sectional view of an airfoil shaped turbine blade embodying the present invention.

Turning now to the drawing, the invention is illustrated and described with reference to an air cooled turbine blade, designated generally by the numeral 10, and particularly adapted for use in the second stage of an axial flow gas turbine engine of an industrial type (not shown) which has a plurality of air-foil shaped turbine rotor blades mounted in angularly spaced relation on a rotor disc. The turbine blade 10 has a more or less conventional outer configuration and comprises a hollow elongated body, indicated generally at 12, which includes a concave inner side wall 14 and an opposing convex outer sidewall 16. The sidewalls terminate at longitudinally extending leading and trailing edges indicated, respectively at 18 and 20. The body 12 further includes a root portion 22 at one end and elongated blade portion 24 which extends from the root portion and terminates at a tip 26, which is closed by a separately inserted sealing plate 28. A platform 30 extends outwardly from the body at the junction between the root and blade portions. The root portion is preferably provided with attachment shoulders (not shown) which may have a conventional fir tree configuration for mounting the turbine blade 10 in complementary slots in a rotor disc.

In accordance with the present invention, a threepass series flow cooling passageway system is provided for convectively cooling the blade 10 and indicated generally by the numeral 32. The passageway system 32 comprises three series connected passage sections 34, 36 and 38 which generally define a reversing fluid flow path between the inner or root end of the turbine blade 10 and a longitudinally spaced series of outlet passages or slots 40, 40 formed in the trailing edge 20. The passageway system 32 further includes two blind passage sections 42 and 44 which are formed within the root portion 22 and which merge with the passage section 36 and 38 proximate the junction of the latter sections.

The passage section 34 is defined, in part, by the inner wall of the leading edge 18, the latter wall being designed by the numeral 46. It will be noted that the part of the wall 46 which defines the portion of the passage section 34 within the leading edge of the blade portion 24 is forwardly offset from the part of the wall 46 which defines the portion of the passage section 36 within the root portion 22. This offset occurs proximate the junction between the root and blade portions. The passageway 34 is further defined by a wall rib 48 which extends transversely between the sidewalls 14 and 16 and is spaced rearwardly of the wall 46. The wall rib 48 extends from the root end of the turbine blade 10 toward its tip 26 and terminates in longitudinally spaced relation to the sealing plate 28. As shown in FIG. 1, the wall rib 48 is outwardly inclined in the direction of the leading edge 18, so that the passageway section 34 generally converges in the direction of the tip 26.

The midchord passage section 36, is defined in part by the wall rib 48, and is further defined by another wall rib 50 which extends from the tip end 26 and in the direction of the root end of the turbine blade. The wall rib 50 extends between the sidewalls 14 and 16 and is inclined inwardly and in the direction of the wall rib 48 relative to the longitudinal axis of the turbine blade. The wall rib 50 terminates proximate the junction between the root and blade portions 22 and 24, substantially as shown. another wall rib 52 extends from the root end in the direction of the tip 26 and terminates in longitudinally spaced relation to the wall rib 50. The wall rib 52 cooperates with the portion of the wall rib 48 to define the blind passageway 42 and also cooperates with a trailing edge wall 54 to define the other blind passage section 44.

The rear passage section 38 extends through the blade portion 24 in the region of its trailing edge and is defined in part by the wall rib 50. A plurality of partitions or elongated pedestal members 56, 56 are arranged in Venetian blind array and extend between the sidewalls 14 and 16 generally adjacent the trailing edge 20 to define the slots 40, 40 which communicate with the rear passage section 38.

Four generally cylindrical pedestal members 58, 58 disposed within the forward passage section 34 and extend between the sidewalls 14 and 16 proximate the junction of the rib and blade portions 22 and 24 at a turn in the forward passage section 34. The latter pedestals are disposed in a generally in-line arrangement inclined to the longitudinal axis of the turbine blade, substantially as shown in FIG. 1. A plurality of generally cylindrical pedestal members 60, 60 are disposed within the midchord passageway section 36 and extend between the sidewalls 14 and 16. Two additional pedestal members 62, 62, which extend between the sidewalls, are disposed at the entry end of the rear passage section 38 proximate the junction between the root and blade portions and adjacent the downstream end of the inner turn in the passageway system 32.

A pair of airfoil shaped turning vanes 64 and 66 extend between the sidewalls 14 and 16 proximate the entry end of the midchord passage section 36 and generally between the terminal end of the wall rib 48 and the sealing plate 28, substantially as shown in FIG. 1. A metering plate 68 attached to the inner end of the turbine blade 10 provides closures for the blind passageways 42 and 44 and has a metering orifice 70 which communicates with the passage section 34. The metering plate 68 is preferably welded or brazed to the inner end of the body 12, which is preferably made by a casting process. To facilitate casting the body 12 is made with an opening at its tip end 26. The latter opening is closed by the sealing plate 28, which, as shown, is received within a slot in the tip end of the body.

Cooling air from the blade disc (not shown) enters the forward passage section 34 through the metering orifice 70. The cross-sectional area of the forward passage section 34 increases abruptly at the junction between the root and blade portions due to the forward offset of the leading edge inner wall 46. The four pedestals 58, 58 prevent local flow separation at this turn in the flow path by causing turbulence in the flow and forcing it outwardly against the inner wall 46 and inwardly against the wall rib 48 thereby preventing the development of a hot spot in this region of the blade. The cooling air flows the full span of the blade through the forward passage section 34 until it reaches the tip end 26 where it is blocked by the sealing plate 28. The turning vanes 64 and 66 assist in directing the flow of cooling air into the midchord passage section 36, as indicated by the flow arrows in the FIG. 1, and control separation of flow to prevent development of hot spots in this outer turning region.

The pedestal members 60, 60 in the midchord passage section 36 prevent sidewall vibration and cause turbulent flow within the passage section 36 which results in a scrubbing action on the walls of the passage section for more efficient cooling. After flowing through the midchord passage section 36 the cooling air rounds the inner end of the wall rib 50 at an inner turning region and passes over the pedestal members 62, 62 and into the rear passage section 38 where it emits from the slots 40—40 at the inner end of the rear passage section 38 generally adjacent the inner turning region, indicated by the flow arrow in FIG. 1. The pedestal members 62, 62 prevent flow separation and cause flow to emit from the trailing edge slots 40—40 near the inner end of the blade portion 20, thereby preventing development of a hot spot in this region.

The metering plate 68 governs the magnitude of cooling flow through the turbine blade 10 and permits future modification of the blade cooling system, such as an up-rating of the cooling system, without expensive alteration or blade redesign. Presently, 0.5% engine air is used to cool the turbine blade 10. However, the criteria in determining the amount of cooling air which must flow through the blade is determined by the maximum temperature to which the blade will be subjected. A 1500° F. maximum blade temperature is thought to be desirable to prevent fuel products deposits from sticking to the blade.

Figure 3:
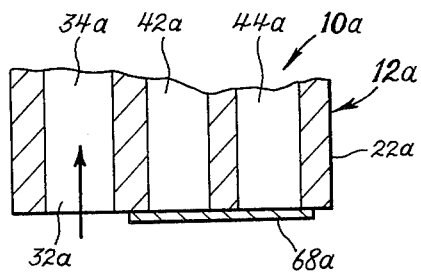
FIG. 3 is a fragmentary longitudinal sectional view similar to FIG. 1 and shows a modified form of the turbine blade of FIG. 1.
Figure 2:
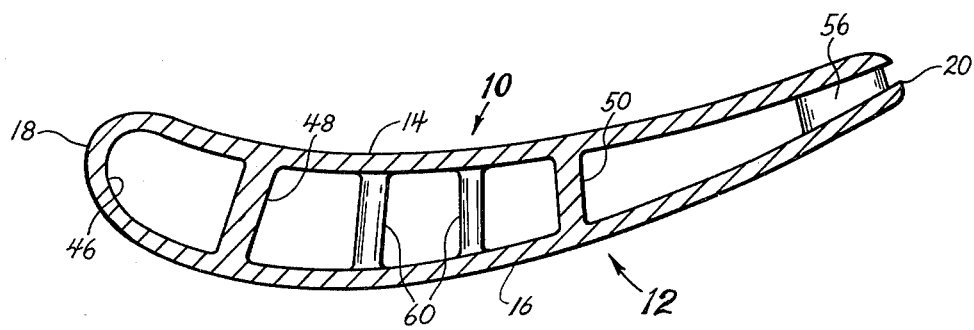
FIG. 2 is a somewhat enlarged fragmentary sectional view taken along the line 2—2 of FIG. 1.

In FIG. 3 there is shown a turbine blade 10a for a "first generation" gas turbine engine. The hollow body 12a of the blade 10a is substantially identical to the body 12 of the previously described blade 10. However, the separate plate 68a, which is attached to the inner end of the body 12a serves only as a closure for the blind passage section 42a and 44a. The passage section 34a which opens through the inner end of the body allows maximum cooling air flow through the passage system 32a.

It will now be apparent that the magnitude of cooling flow through the turbine blade may be altered by attaching to the inner end of the body a separate metering plate having a metering orifice of appropriate size. Thus, the rating of the cooling system may be changed without altering the body of the turbine blade.

We claim:

1. A turbine blade having a hollow elongated body including longitudinally extending leading and trailing edges and having a root portion at its inner end and a blade portion extending from said root portion and terminating at a closed tip at its outer end, said body having walls defining a triple-pass fluid passageway including three series connected passage sections providing a reversing fluid flow path through said body from said inner end to said trailing edge, said walls including a leading edge wall defining said leading edge, opposing side walls extending between said leading and trailing edges, and rib walls connected to and extending transversely between said side walls, said rib walls including a forward rib wall spaced rearwardly from said leading edge wall and extending in a generally longitudinally inclined direction within said blade portion from said inner end toward said leading edge wall and in the direction of said outer end, said forward rib wall having a terminal end longitudinally spaced from said closed tip, said leading edge wall and said forward rib wall partially defining a forward passage section therebetween opening through said inner end and extending through said root portion and into said blade portion in the region of said leading edge and terminating within said blade portion at an outer turning region proximate said closed tip, one part of said leading edge wall defining the portion of said forward passage section within said blade portion having an abrupt forward offset relative to another part of said leading edge wall defining the portion of said forward passage section within said root portion, said forward offset occurring proximate the junction of said root and blade portions, said forward passage section having an abruptly enlarged cross-sectional area at the junction of said root and blade portions and generally converging within said blade portion and toward said outer turning region, said rib walls including a rear rib wall spaced rearwardly from said forward rib wall and extending in a generally longitudinally inclined direction from said closed tip toward said forward rib wall and in the general direction of said inner end, said rear rib wall having a terminal end proximate the junction of said root and blade portions, said forward rib wall and said rear rib wall partially defining a midchord passage section communicating with said forward passage section at said outer turning region between the terminal end of said forward rib wall and said closed tip, said midchord passage section converging within said blade portion and in the direction of said inner end, said rear wall rib and said trailing edge partially defining a rear passage section within said blade portion in the region of said trailing edge and terminating at said closed tip, said rear passage section communicating with said midchord passage section at an inner end, said rear passage section converging within said body portion and in the direction of said closed tip, said body including a longitudinally spaced series of partitions connected to and extending between said side walls generally adjacent said trailing edge and defining a longitudinal series of slots opening through said trailing edge and communicating with said rear passage section, said body having a plurality of pedestal members connected to and extending between said side walls within said forward passage section and proximate the junction of said root and blade portions.

2. A turbine blade as set forth in claim 1 including a metering plate attached to said body at said inner end and having a metering orifice therethrough communicating with said forward passage section.

3. A turbine blade as set forth in claim 1 including another wall rib within said root portion and extending from said inner end and toward the terminal end of said rear wall rib, said other wall rib partially defining two blind passage sections within said root portion merging with said midchord passage section and said rear passage section at the junction between said midchord passage section and said rear passage section.

4. A turbine blade as set forth in claim 3 wherein said blind passage sections open through said inner end and including a plate attached to the inner end of said body and providing closures for the inner ends of said blind passage sections.

5. A turbine blade as set forth in claim 4 wherein said plate has a metering orifice therethrough communicating with said forward passage section.

6. A turbine blade as set forth in claim 1 wherein said body has a slot in its outer end and said turbine blade includes a plate received in said slot and defining a closure for said closed tip.

7. A turbine blade as set forth in claim 1 wherein said root portion has a trailing edge wall, said triling edge of said blade portion is defined by said opposing side walls and has an abrupt rearward offset proximate the junction of said root and blade portions and relative to said trailing edge wall, and said body has a plurality of pedestal members connected to and extending between said side walls within said rear passage section proximate the junction of said root and blade portions.

8. A turbine blade as set forth in claim 7 wherein said body has at least one turning vane connected to and extending between said side walls in said outer turning region and a plurality of pedestals connected to and extending between said sidewall within said midchord passage section.

* * * * *